United States Patent Office 3,449,160
Patented June 10, 1969

3,449,160
PROCESS FOR THE PRODUCTION OF FINE POROUS COATINGS ON TEXTILES WITH PREPARATIONS CONTAINING A POLYMER AND MICROCAPSULES
Peter Hofmann Uznach and Christian Guth, Basel, Switzerland, assignors to Ciba Limited, Basel, Switzerland, a company of Switzerland
No Drawing. Filed Feb. 23, 1966, Ser. No. 529,205
Claims priority, application Switzerland, Mar. 11, 1965, 3,417/65
Int. Cl. D06m 13/40; B44d 1/20; C09d 5/00
U.S. Cl. 117—135.5          12 Claims

ABSTRACT OF THE DISCLOSURE

Process for producing fine, porous coatings on textile goods, which comprises coating the textiles with an aqueous preparation containing a cross-linkable polymer and microcapsules enclosing a water-insoluble organic liquid boiling above 100° C. The coatings are dried and then heat-treated to rupture the microcapsules, enabling the encapsulated liquid to bleed out and pores are formed.

---

It has been found that valuable fine, porous coatings can be produced on textile goods by coating them with an aqueous preparation containing in an even, fine dispersion (a) a polymer and (b) microcapsules containing a water-insoluble organic liquid and drying the coating.

Fine porous coatings for the purposes of this invention are coatings interspersed with very fine pores, so that they are permeable to gases and vapours, especially air saturated with steam, but will not allow true liquids, above all water to pass. These coatings can be produced on woven and knitted fabrics of all kinds, for example those from synthetic fibres such as polyamide fibres, polyester fibres, cellulose acetate fibres, from fibres from regenerated cellulose, especially viscose rayon, or from native cellulose fibres, above all cotton. Textiles from mixed threads and mixed fabrics, for example from cotton and polyesters, may likewise be used.

It is advantageous to use polymers that can be cross-linked with themselves or, if this is not the case, with epoxides or aminoplasts. As examples of polymers that can be cross-linked with themselves there may be mentioned the copolymers of N-methylol-substituted amides of an α,β-unsaturated monocarboxylic or dicarboxylic acid or of ethers of these methylolamides obtained by aqueous emulsion polymerization of the monomeric compounds, the polymerization being carried out in the presence of a minor amount of a water-soluble alkaline earth metal salt of an α,β-ethylenically unsaturated monocarboxylic acid. Particularly suitable are copolymers prepared in an aqueous emulsion prepared from (a) 0.25 to 10% of an alkaline earth metal salt of an α,β-ethylenically unsaturated monocarboxylic acid, for example calcium acrylate,
(b) 0.25 to 30% of an N-methylolamide or N-methylolamide ether of an α,β-unsaturated monocarboxylic or dicarboxylic acid, for example acrylic acid methylolamide, and
(c) 99.5 to 60% of at least one copolymerizable compound, for example of an alkyl ester of an α,β-unsaturated carboxylic acid, or of an amide of such an acid, or of another compound, such as vinylidenechloride.

Furthermore, there may be used in the present process polymers that contain other not functionally modified carboxylic acid groups, for example HOOC groups, alkali metal-OOC groups or NH₄.OOC groups. Suitable copolymers are those prepared with the use of the acid, or of a salt thereof, and a preponderant share of an alkyl ester such as the methyl, ethyl, isopropyl or butyl ester of an ethylenically unsaturated acid, for example of chloracrylic, methacrylic or acrylic acid. Thus, there may be used a polymer prepared from one of the above-mentioned acrylic acid alkyl ester, from acrylonitrile (advantageously used in an amount not exceeding 30%) and a small amount, for example 1 to 10%, of acrylic acid.

The emulsion polymers of the composition defined above have the advantage that they possess as such already a consistency high enough for coating tetxile materials or that such a consistency can be imparted to them by quite simple measures, for example by the addition of ammonia to the copolymers containing free carboxylic acid groups.

When the cross-linking operation is performed with the additional use of aminoplasts, good results may be achieved, for example, with unetherified or etherified methylol compounds of the urea or of its derivatives, such as ethylene-urea, and especially with methylolmelamines, especially melamines that are highly etherified with methanol or highly methylolated, for example on an average on at least 5 of the 6 reactive positions of the molecule.

Particularly useful epoxides serving as cross-linking agents are polyglycidyl compounds that contain at least two

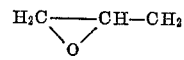

groups bound with an oxygen or a sulphur or nitrogen atom, such as the diglycidyl or polyglycidyl ethers of dihydroxy or polyhydroxy compounds, especially of polyalcohols or polyphenols.

As mentioned above, it is advantageous to use as cross-linking agent in the case of polymerization resins that cannot be cross-linked with themselves aminoplasts or epoxides, and these agents may also be used additionally for cross-linking polymerization resins that can be cross-linked with themselves. The cross-linking agent is advantageously used in an amount of 1 to 10%, preferably 1.5 to 3%, referred to 100% dry polymerization resin.

Apart from the polymers the preparations to be used in the present process contain microcapsules enclosing a water-insoluble organic liquid. The average diameter of the microcapsules to be used in this invention should not exceed 200μ and is advantageously from 50 to 100μ. The minimum average diameter of the capsules should not be less than 10μ to ensure that the aim, that is to say permeability to gases and impermeability to liquids of the coatings, is actually reached. Microcapsules and methods for their manufacture are known. However, it has been found that the present purpose is best achieved with two types of microcapsules that are new; they are manufactured in the following manner:

(A) Microcapsules are prepared by performing the polycondensation in an emulsion whose external phase is an aqueous medium and whose internal phase is a water-insoluble organic liquid, one phase containing one and the other phase containing the other of two starting materials capable of forming together polycondensates. The polycondensate obtained in this manner constitutes the shell of the capsule. The components for the polycondensate are advantageously selected so that they remain substantially to practically completely in the one phase and are not inducted into the other phase. For example, there are used on one hand a water-soluble component which is insoluble in the organic liquid which is to form the content of the capsule, and, on the other hand, a component that is insoluble in water but soluble in the organic liquid. Thus, capsule shells from polyamide are obtained by adding to the aqueous phase a polyamine and to the organic liquid a halide of an at least dibasic acid. Particularly suitable are polyalkylene polyamines such as diethylene triamine, triethylenetetramine or tetraethylene pentamine or mixtures of such amines and dichlorides of disulphonic acids or dicarboxylic acids, such as phthalic acid, especially of aliphatic dicarboxylic acids, for example those which contain at least 6 carbon atoms, such as adipic, suberic or sebacic acid.

For the manufacture of emulsions and the subsequent encapsulation of the organic liquid emulsifiers are required. An emulsifier suitable for making polyamide shells is, for example, casein.

There may be further added other emulsifiers and additives, preferably in small amounts, that improve the stability of the emulsion, for example protective colloids or thickeners. As suitable relevant examples there may be mentioned sodium alginate and higher fatty acids such as stearic acid, or salts of these fatty acids with the abovementioned polyamine of which an excess is present.

The microcapsules obtained in this manner then have to be separated from the aqueous phase. In addition, it is advisable to aftertreat the capsules in a suitable manner so as to remove any substances remaining from the aqueous phase on the surface, for example in the case of sodium alginate with an aqueous aluminium salt solution and then to wash the capsules carefully with water (see also what follows sub B).

The microcapsules are manufactured by adding an agent capable of forming a water-insoluble alginate to an emulsion whose external phase is an aqueous medium and whose internal phase is a water-insoluble organic liquid and whose external phase contains an alginate, for example sodium alignate, dissolved therein. Suitable relevant agents are above all water-soluble aluminium salts such as aluminium chloride. This addition results in the formation of the water-insoluble aluminium alginate as an envelope to the internal phase. This operation is advantageously carried out with addition of a higher fatty acid. This type of capsule, too, requires separation from the aqueous medium and washing.

According to this invention the capsule is filled with water-insoluble organic liquid. It is advantageous to use liquids that boil above 100° C. and produce no objectionable side effects, that is to say, for example, produce no unpleasant smell in the finished material, and do not inhibit the hydrophobizing effect of the subsequently applied finish. Particularly good results are achieved with mineral oils such as paraffin oil. The microcapsules prepared, for example, as described under A or B above may be added to the aqueous preparation required for the coating operation immediately after their manufacture. It is, however also possible to store the capsules in the form of an aqueous suspension for long periods and to use them as and when required.

The proportions of (a) the polymer and (b) the oil contained in the microcapsules may vary within wide limits; for example the ratio of $a:b$ may vary from 100:10 to 100:100 and advantageously from 100:15 to 100:35.

The mixture is applied to the textile material in the conventional manner, for example with a doctor device, and then dried. One or several successive coats may be applied to the textile material; in the latter case an intermediate drying between successive coats is required. The cross-linking—especially when the coating contains an aminoplast and a carrying catalyst—is advantageously carried out by heating the coated material for a short time, for example for a few minutes, at temperatures within the range from 140 to 200° C.

The material treated in this manner is porous and impermeable to water. When this material is dried at a temperature below 100° C., for example at room temperature or at a slightly raised temperature, for example at about 50° C., and more especially during the subsequent heat treatment the content of the capsules flows out and pores are formed.

In many cases it is advisable to combine the production of the fine, porous coating with a hydrophobizing treatment of the textile material. The latter may be carried out before or preferably after the coating operation in the usual manner, for example with the use of a paraffin oil emulsion, or with certain metal compounds, for example of aluminium or zirconium, or with aminoplasts, especially melamine compounds containing higher alkly radicals, or with the known methylhydrogensiloxane emulsions, or with perfluorinated compounds that are at the same time oil-repellent, possibly in combination with methylolmelamines containing higher alkyl radicals, and other melamines.

Instead of coating the textile material unilaterally according to this invention it may also be coated on both sides or subjected to other treatments usual with textile materials. Thus, for example, foamed products, especially foamed rubber material, may be stuck on to the textile material with the aid of the coating, whereby porosity and impermeability to water are achieved.

Unless otherwise indicated parts and percentages in the following examples are by weight.

Example 1

100 g. of a 50% aqueous dispersion of a copolymer from 85% of acrylic acid isobutyl ester, 10% of acrylonitrile and 5% of acrylic acid, containing as dispersant 1.4 parts of sodium $a$-oxyoctadecanesulphonate are thoroughly stirred and then mixed with 37 g. of heavy gasoline at 30° C. in which there are dissolved 3 g. of a mixture of 45% of a condensation product from stearic acid and hexamethylolmelamine hexamethyl ether, and then with triethanolamine in the molecular ratio of 2:1:1, 45% of paraffin oil and 10% of tetrachloroethylene.

A solution of 0.5 g. of ammonium chloride in 1.5 g. of water and 3 ml. of 25% aqueous ammonia is then added to the above mixture. This leaves the coating preparation in a brushable consistency and it already contains the catalyst.

5 grams of a 75% solution of a hexamethylolmelamine etherified with methyl groups on 5 hydroxyl groups and 9.3 g. of a capsule-making mixture containing about 5 g. of encapsulated oil, are then stirred into the resulting mixture. This capsule-making mixture is prepared as follows:

An aqueous solution is prepared which contains in 100 ml. of water 20 ml. of an aqueous solution containing, per litre, 50 g. of casein and 20 g. of triethylene tetramine, 1.6 g. of triethylene tetramine and 80 g. of an aqueous solution containing per kg. 50 g. of sodium alginate.

The oily phase, to be encapsulated, consisting of 95 g. of a mineral oil (Shell Oil L 6189) which is mixed with 5 g. of sebacic acid dichloride is introduced in the form of a fine jet within 4½ minutes into the aqueous phase, while stirring the batch with a high-speed agitator (diameter 50 mm.) rotating at 4000 revolutions per minute.

During the stirring the pH value drops to 7 and the emulsion becomes rather coarse, in fact much coarser than a comparable emulsion that does not contain sebacic acid dichloride or triethylene tetramine.

The emulsion prepared as described is diluted with 1 litre of water. After some time the diluted emulsion begins to separate into two layers. The aqueous phase is removed and the solid phase, which contains the encapsulated oil, is washed with 1 litre of water and filtered. The solid phase, with some alginate adhering to its surface, is then suspended in 1 litre of water and added to 1 litre of a solution of 10 g. of aluminium chloride per litre of water which is vigorously stirred with a 50 mm.-diameter agitator at 2000 revolutions per minute. This mixture is again allowed to stand for some time and then filtered. If the consumed aluminium chloride is replenished, the filtrate may be reused. The solid substance, which contains the encapsulated oil, is washed on the filter with 1 litre of water and then, as mentioned above, added to the coating composition.

In this manner 185 g. of a capsule-making composition are obtained of which 9.3 g. are stirred into the mixture described above.

The mixture, that is to say the coating composition, prepared in this manner can be applied by means of a doctor device on one side of a variety of fabrics. When a thin coat is desired, the doctor knife is passed once over the fabric, when substantially water-impermeable coats are aimed at, two passages are performed. The coatings produced in this manner are not completely continuous because when the coated fabric is dried, above all condensed for 5 minutes at 150° C., the encapsulated oil bleeds out from its capsules and thus forms pores. If between the drying and the condensing of the coating the coated fabric is padded with an aqueous preparation containing in 1000 parts by volume: 60 parts of the above-described mixture of a melamine condensate, paraffin oil and tetrachloroethylene, 15 parts by volume of acetic acid of 40% strength and 3 parts of aluminium sulphate, and then dried and condensed for 5 minutes at 150° C., it is not only left permeable to steam and substantially impermeable to water but also very water-repellent as is shown by the following values recorded on examination of a cotton+polyester fabric treated in this manner:

PROPERTIES FOUND IN A COMPLETELY FINISHED FABRIC

| | | | |
|---|---|---|---|
| (1) Number of passages of doctor knife | 0 | 1 | 2 |
| (2) Adhesion of the coat | | Good | Good |
| (3) Adhesion after washing | | Good | Good |
| (4) Weight of coat in g./m.$^2$ | | 17 | 25 |
| (5) Loss in weight of coat after 3 dry-cleanings with trichloroethylene, in percent | | 8 | 8 |
| (6) Water impermeability, water column tests according to Heermann, height of water column until the first 3 drops of water penetrate the fabric, cm | 29 | 60 | 74 |
| (7) Maximum height of water column in cm. achievable for an increase in height of water column of 1 cm./sec | 35 | 120 | 145 |
| (8) Permeability to steam, moisture drop in g./sq. m./hour, at 100% R.H. at 20° C | 42 | 25 | 25 |
| (9) Water repellency sprinkler test according to Bundesmann absorption, in percent | 16 | 17 | 18 |
| Penetration, ml | 3 | 0 | 0 |
| Visual assessment (5=good, 1=poor) after— | | | |
| 1 minute | 4 | 3 | 3 |
| 5 minutes | 3 | 2 | 2 |
| 10 minutes | 2 | 2 | 2 |

The characteristics 2 to 5 were hardly affected by the pore-forming capsules contained in the coating; they depend above all on the film-forming component, that is to say in this case on the acryl copolymer of the constitution defined above.

Example 2

The procedure is as described in Example 1, except that the polymer dispersion described at the beginning of the example is replaced by a dispersion, adjusted to a solids content of 30%, prepared in the following manner:

15 parts of sodium laurylsulphate and 15 parts of sodium a-oxyoctadecanesulphonate are dissolved in 900 parts of deionized water with stirring at about 30 to 35° C. in a stirring vessel equipped with reflux condenser and thermometer. The air in the apparatus is then displaced with nitrogen and the whole is cooled to 20 to 25° C. The solution is mixed with 11.3 parts of calcium acrylate (1.5%), 50 parts of a 60% aqueous solution of N-methylolacrylamide. (4%), 578 parts of n-butyl acrylate (80.5%) and 101 parts of vinylidenechloride (14%), and the whole is gently stirred and heated to an internal temperature of 50° C. The resulting mixture has a pH value of 5 to 6. At 50° C. there are then added a solution of 0.35 part of sodium bisulphite in 3.5 parts of deionized water and a solution of 0.7 part of potassium persulphate in 14 parts of deionized water. Polymerization sets in immediately and is controlled by occasional cooling so that the temperature does not exceed 75° C. When the temperature maximum has been reached, the polymerization is finalized by heating 4 to 5 hours at about 70 to 75° C. and by adding after the passage of about half this reaction time another solution of 0.7 part of potassium persulphate in 14 parts of deionized water. After cooling, an almost pure emulsion is obtained which is of a thickly syrupy consistency and has a dry content of 43%. The polymer yield is 94 to 95% of the theoretical.

To prepare the coating composition there are added for 100 g. of the 30% polymer dispersion as additional cross-linking agent 2.5 g. of a 75% solution of a hexamethylolmelamine etherified by methyl groups on 5 hydroxyl groups, as catalyst 2 ml. of amminium chloride solution (containing 0.5 g. of ammonium chloride) and as pore-former 9.5 g. of the capsule-making substance prepared as described in Example 1, and the whole is worked up as indicated. The finished composition is applied to a fabric, dried and heated for 5 minutes at 150° C.

Example 3

The procedure is the same as in Example 1, except that the paraffin oil is encapsulated, instead of with the polyamide of the kind described, by precipitating the sodium alginate enveloping the oil droplets with an aluminium salt, whereby a water-insoluble capsule shell is formed.

200 ml. of an aqueous solution is then prepared which contains 25 g. per kg. of sodium alginate and 1 ml. of concentrated ammonia. A solution, heated at 50° C., consisting of 95 g. of paraffin oil and 5 g. of olein is then introduced within 4½ minutes in a thin jet into the above aqueous solution while vigorously stirring with the high-speed stirrer described above at 4000 revolutions per minute. The resulting emulsion is diluted with 1 litre of water, neutralized with 1 litre of 2% acetic acid while being stirred and then stirred into 2 litres of a 0.5% aluminium chloride solution.

The precipitated capsules are filtered off, rinsed with 2 litres of water and incorporated with the coating composition, which may then be used for coating various fabrics as describe din Example 1. The coated fabrics are dried, finished off with a hydrophobizing dressing liquor, and the coating and the hydrophobic layer condensed together for 5 minutes at 150° C.

Instead of the paraffin oil mentioned in the above examples there may be used other substances that do not adversely affect the hydrophobic properties of the completely finished fabric. Their boiling point must be substantially higher than that of water, as is the case, for example, with ortho-, meta- or para-dichlorobenzene or with 1- or 2-ethyl- or methylnaphthalene.

What is claimed is:

1. Process for producing fine, porous coatings on textile goods, which comprises coating the textile goods with an aqueous preparation containing in an even, fine dispersion an effective amount of (A) a polymer that can be cross-linked with a member selected from the group consisting of itself, an aminoplast and an epoxide and (B) microcapsules enclosing a water-insoluble organic liquid boiling above 100° C., and then drying the coatings at a temperature below 100° C., followed by heat-treating said coatings at a temperature above 100° C.

2. Process according to claim 1 for producing fine, porous coatings on textile goods, which comprises coating the textile goods with an aqueous preparation containing in an even, fine dispersion an effective amount of each of (A) a polymer that can be cross-linked with a member selected from the group consisting of itself, an aminoplast and an epoxide, (B) microcapsules enclosing a water-insoluble organic liquid boiling above 100° C., and (C) an aminoplast used for cross-linking the polymer, and then drying the coatings at a temperature below 100° C., followed by heat-treating said coatings at a temperature above 100° C.

3. Process according to claim 1 for producing fine, porous coatings on textile goods, which comprises coating the textile goods with an aqueous preparation containing in an even, fine dispersion an effective amount of (A) a polymer that can be cross-linked with a member selected from the group consisting of itself, an aminoplast and an epoxide, (B) microcapsules enclosing a water-insoluble organic liquid boiling above 100° C. and (C) as an aminoplast used for cross-linking the polymer a methylolmelamine highly etherified with methanol, and then drying the coatings at a temperature below 100° C., followed by heat-treating said coatings at a temperature above 100° C.

4. Process according to claim 1 for producing fine, porous coatings on textile goods, which comprises coating the textile goods with an aqueous preparation containing in an even, fine dispersion an effective amount of (A) a copolymer, prepared by aqueous emulsion polymerization of at least one monomer selected from the group consisting of an N-methylol-substituted amide of an $\alpha,\beta$-unsaturated monocarboxylic acid, an N-methylol-substituted amide of an $\alpha,\beta$-unsaturated dicarboxylic acid, an ether of an N-methylol-substituted amide of an $\alpha,\beta$-unsaturated monocarboxylic acid and an ether of an N-methylol-substituted amide of an $\alpha,\beta$-unsaturated dicarboxylic acid, and (B) microcapsules enclosing a water-insoluble organic liquid boiling above 100° C., and then drying the coatings at a temperature below 100° C., followed by heat-treating said coatings at a temperature above 100° C.

5. Process according to claim 1 for producing fine, porous coatings on textile goods, which comprises coating the textile goods with an aqueous preparation containing in an even, fine dispersion an effective amount of (A) a copolymer prepared by aqueous emulsion polymerization of (a) 0.25% to 10% of an alkaline earth metal salt of an $\alpha,\beta$-ethylenically unsaturated monocarboxylic acid, (b) 0.25 to 10% of an amide selected from the group consisting of an N-methylolamide of an $\alpha,\beta$-ethylenically unsaturated monocarboxylic acid, an N-methylolamide of an $\alpha,\beta$-ethylenically unsaturated dicarboxylic acid, an ether of an N-methylolamide of an $\alpha,\beta$-ethylenically unsaturated monocarboxylic acid and an ether of an N-methylolamide of an $\alpha,\beta$-ethylenically unsaturated dicarboxylic acid, and (c) 99.5 to 60% of at least one other copolymerizable compound, and (B) microcapsules enclosing a water-insoluble organic liquid boiling above 100° C., and then drying the coatings at a temperature below 100° C., followed by heat-treating said coatings at a temperature above 100° C.

6. Process according to claim 1 for producing fine, porous coatings on textile goods, which comprises coating the textile goods with an aqueous preparation containing in an even, fine dispersion an effective amount of (A) a copolymer prepared by aqueous emulsion polymerization of (a) 1.5% calcium acylate (b) 4% N-methylolacrylamide (c) 80.5% n-butylacrylate and 14% vinylidenechloride (B) microcapsules enclosing a water-insoluble organic liquid boiling above 100° C., and then drying the coatings at a temperature below 100° C., followed by heat-treating said coatings at a temperature above 100° C.

7. Process according to claim 1 for producing fine, porous coatings on textile goods, which comprises coating the textile goods with an aqueous preparation containing in an even, fine dispersion an effective amount of (A) a polymer that can be cross-linked with a member selected from the group consisting of itself, an aminoplast and an epoxide and (B) microcapsules prepared by the addition of an agent capable of forming a water-insoluble alginate to an emulsion whose external phase is an aqueous medium and whose internal phase is a water-insoluble organic liquid boiling above 100° C. and in whose external phase an alignate has been dissolved, and then drying the coatings at a temperature below 100° C., followed by heat-treating said coatings at a temperature above 100° C.

8. Process according to claim 1 for producing fine, porous coatings on textile goods, which comprises coating the textile goods with an aqueous preparation containing in an even, fine dispersion an effective amount of (A) a polymer that can be cross-linked with a member selected from the group consisting of itself, an aminoplast and an epoxide and (B) microcapsules prepared by the addition of a water-soluble aluminum salt to an emulsion whose external phase is an aqueous medium and whose internal phase is a water-insoluble organic liquid which boils above 100° C. and in whose external phase an alignate has been dissolved, and then drying the coatings at a temperature below 100° C., followed by heat-treating said coatings at a temperature above 100° C.

9. Process according to claim 1 for producing fine, porous coatings on textile goods, which comprises coating the textile goods with an aqueous preparation containing in an even, fine dispersion an effective amount of (A) a polymer that can be cross-linked with a member selected from the group consisting of itself, an aminoplast and an epoxide and (B) microcapsules prepared by the addition of a water-soluble aluminum salt to an emulsion whose external phase is an aqueous medium and whose internal phase is a mineral oil and in whose external phase an alginate has been dissolved, and then drying the coatings at a temperature close upon 100° C. and then heat-treating them at a temperature above 100° C.

10. Process for producing fine, porous coatings on textile goods, which comprises coating the textile goods with an aqueous preparation containing in an even, fine dispersion (A) a polymer that can be cross-linked with a member selected from the group consisting of itself, an aminoplast and an epoxide and (B) microcapsules enclosing a water-insoluble organic liquid boiling above 100° C., the ratio of A:B being from 100:10 to 100:100, drying the coatings at a temperature below 100° C. then heat-treating the coatings at a temperature above 100° C.

11. Process according to claim 10, wherein the average diameter of the microcapsules is 10 to 200$\mu$.

12. Process according to claim 11, wherein the average diameter of the microcapsules is 50 to 100$\mu$.

References Cited

UNITED STATES PATENTS

| | | | |
|---|---|---|---|
| 2,954,358 | 9/1960 | Hurwitz | 260—29.6 |
| 3,081,197 | 3/1963 | Adelman | 117—140 |
| 2,868,742 | 1/1959 | Burnham | 117—135.5 X |
| 3,288,740 | 11/1966 | Maeder et al. | 260—29.6 |
| 2,907,682 | 10/1959 | Eichel | 117—21 X |

WILLIAM D. MARTIN, *Primary Examiner.*

T. G. DAVIS, *Assistant Examiner.*

U.S. Cl. X.R.

117—121, 138.8, 143, 145, 161